United States Patent
Liu

(10) Patent No.: US 9,829,920 B1
(45) Date of Patent: Nov. 28, 2017

(54) DETACHABLE COMPUTER

(71) Applicant: PARTNER TECH CORP., New Taipei (TW)

(72) Inventor: Tang-An Liu, New Taipei (TW)

(73) Assignee: PARTNER TECH CORP., New Taipei (TW)

( * ) Notice: Subject to any disclaimer, the term of this patent is extended or adjusted under 35 U.S.C. 154(b) by 0 days.

(21) Appl. No.: 15/461,407

(22) Filed: Mar. 16, 2017

(30) Foreign Application Priority Data

May 30, 2016 (TW) .............................. 105208037 U

(51) Int. Cl.
  *G06F 1/16* (2006.01)
(52) U.S. Cl.
  CPC .......... *G06F 1/1632* (2013.01); *G06F 1/1654* (2013.01)
(58) Field of Classification Search
  CPC .............................. G06F 1/1632; G06F 1/1654
  USPC ................. 361/679.41–679.45; 710/303, 304
  See application file for complete search history.

(56) References Cited

U.S. PATENT DOCUMENTS

| | | | | |
|---|---|---|---|---|
| 7,035,094 B2 * | 4/2006 | Huang | ................. | G06F 1/1626 361/679.55 |
| 7,911,779 B1 * | 3/2011 | Tarnoff | ................. | G06F 1/1626 361/679.4 |
| 8,182,426 B2 * | 5/2012 | Zhao | ................. | A61B 8/00 361/679.21 |
| 9,471,103 B2 * | 10/2016 | Shibuya | ................. | G06F 1/1632 |
| 9,760,116 B2 * | 9/2017 | Wylie | ................. | G06F 1/1632 |
| 2005/0128693 A1 * | 6/2005 | Itoh | ................. | G06F 1/1626 361/679.26 |
| 2007/0152633 A1 * | 7/2007 | Lee | ................. | G06F 1/1632 320/114 |
| 2007/0168593 A1 * | 7/2007 | Montag | ................. | G06F 1/1601 710/303 |
| 2012/0170212 A1 * | 7/2012 | Gallouzi | ................. | F16M 11/041 361/679.56 |
| 2012/0287594 A1 * | 11/2012 | Ko | ................. | G07G 1/0018 361/809 |
| 2015/0103483 A1 * | 4/2015 | Lin | ................. | G06F 1/1632 361/679.43 |

* cited by examiner

*Primary Examiner* — Nidhi Thaker
(74) *Attorney, Agent, or Firm* — Chieh-Mei Wang

(57) ABSTRACT

A detachable computer includes a host, an expansion base, a first latch structure and a second latch structure. The first and second latch structures are disposed on a back surface of the host and an engaging surface of an engaging plate of the engaging plate respectively. One of each pair of the first and second latch structures includes a clamp portion and another one includes a clip member. The host is engaged with the engaging plate by latching the clip member with the clamp portion. The clip member includes a frame and a clip column. The clip column extends from a first sidewall to a second sidewall of the frame. The clip member is latched into the clamp portion through the clip column. Two sides of the clamp portion substantially abut against the first and second sidewalls when the clip column is latched into the clamp portion.

8 Claims, 9 Drawing Sheets

DETACHABLE COMPUTER

FIELD OF THE INVENTION

The present invention relates to an electronic device, and more particularly to a detachable computer.

BACKGROUND OF THE INVENTION

With the progress of computer-related industries, the point of sales (POS) system is becoming more and more powerful and is widely used by the retail, financial, hospitality or other industries.

The early point of sales system has the integrated design, and therefore is not suitable for carrying due to the large size and heavy weight. In recent years, point of sales system with detachable host and expansion base has been gradually developed, so that the host can be easily detach from the expansion base and carried when necessary.

When the detachable host and the expansion base are engaged with each other, the electrical connection portion of the host and the electrical connection portion of the expansion base are connected to each other. However, since the user may perform a click operation on the host, the host and the expansion base may shake relative to each other during the operation if the engagement between the host and the expansion base is not stable. After a long period of time, a poor electrical connection between the host and the expansion base or even a malfunction may be resulted.

SUMMARY OF THE INVENTION

Therefore, one object of the present invention is to provide a detachable computer in which the host and the expansion base can be engaged with each other firmly and easily detachable from each other.

In order to achieve the above-mentioned advantages, the present invention provides a detachable computer, which includes a host, an expansion base, at least one first latch structure and at least one second latch structure. The host has a display surface and a back surface opposite to each other. The at least one first latch structure is provided on the back surface. The expansion base includes an engaging plate for engaging with the host. The at least one second latch structure fits with the at least one first latch structure and is provided on an engaging surface of the engaging plate for engaging with the host. One of each pair of the first latch structure and the second latch structure includes a clamp portion, and another one of each pair of the first latch structure and the second latch structure includes a clip member. The host is engaged with the engaging plate by latching the clip member with the clamp portion. The clip member includes a frame and a clip column. The clip column extends from a first sidewall of the frame in a predetermined direction to a second sidewall of the frame opposite to the first sidewall. The clip member is latched into the clamp portion through the clip column. Two sides of the clamp portion substantially abut against the first sidewall and the second sidewall when the clip column is latched into the clamp portion.

In one embodiment of the present invention, the engaging plate has a platform deck extending from a bottom edge of the engaging plate in a direction away from the engaging surface. The platform deck is provided with a first electrical connection portion. A bottom surface of the host, located between the display surface and the back surface, is provided with a second electrical connection portion. When the host is engaged with the engaging plate, the bottom surface of the host is connected to the platform deck, and the first electrical connection portion and the second electrical connection portion are electrically connected to each other.

In one embodiment of the present invention, the predetermined direction is parallel to the bottom edge of the engaging plate.

In one embodiment of the present invention, the clamp portion includes two opposite gripping arms. Two side edges of the two gripping arms substantially abut against the first sidewall and the second sidewall when the clip column is latched into the clamp portion.

In one embodiment of the present invention, a total number of the at least one first latch structure and a total number of the at least one second latch structure are two respectively. Each of the first latch structures includes the clip member. Each of the second latch structures includes the clamp portion. Each of the first latch structures further includes a handheld strap fixing portion attached to the frame. The detachable computer further includes a handheld strap fixed between the handheld strap fixing portions.

In one embodiment of the present invention, each of the first latch structures includes the clip member. Each of the second latch structures includes the clamp portion. Each of the first latch structures further includes an extension block connected to the frame. The engaging plate is further provided with a locking member corresponding to the extension block. When the host is engaged with the engaging plate and the locking member is switched to a locking state, the locking member blocks the extension block from moving in a direction away from the engaging plate.

In one embodiment of the present invention, the platform deck is further provided with at least one alignment bolt. The bottom surface of the host is further provided with at least one alignment hole corresponding to the at least one alignment bolt. The at least one alignment bolt is inserted into the at least one respective alignment hole when the host is engaged with the engaging plate.

In one embodiment of the present invention, the bottom surface of the host has a concave portion, and second electrical connection portion is provided at the concave portion. The platform deck has a convex portion matching to the concave portion, and the first electrical connection portion is provided at the convex portion. The concave portion and the convex portion are engaged with each other when the host is engaged with the engaging plate.

In one embodiment of the present invention, the engaging surface of the engaging plate has a groove. The at least one second latch structure is provided in the groove. The at least one first latch structure protrudes out of the back surface of the host.

In one embodiment of the present invention, the back surface of the host has at least one groove corresponding to the at least one first latch structure. Each of the first latch structures is provided in the respective groove. The at least one second latch structure protrudes out of the engaging surface of the engaging plate.

In the detachable computer of the present invention, because the two side edges of the clamp portion can substantially abut against the first sidewall and the second sidewall of the frame of the clip member by latching the clip column into the clamp portion, the host and the expansion base can be engaged with each other firmly. Moreover, such engagement also facilitates detachment of the host and the expansion base.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
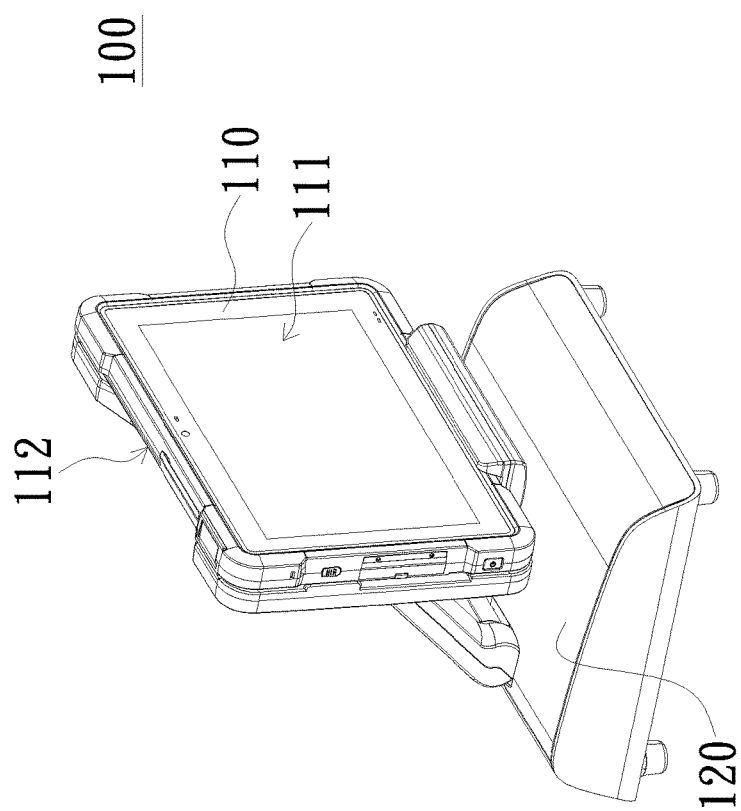
FIG. 1 is a schematic perspective view of a detachable computer in accordance with an embodiment of the present invention.
Figure 2:
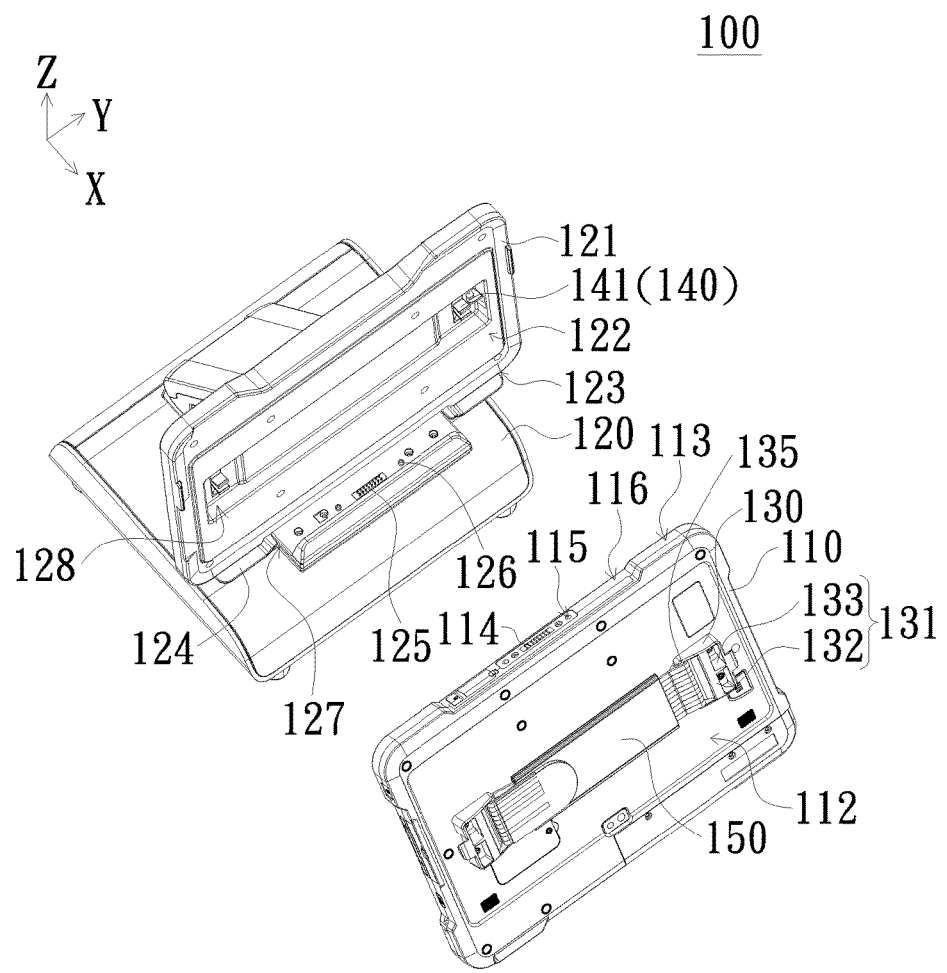
FIG. 2 is a perspective view illustrating that a host is detached from an expansion base in FIG. 1.

FIG. 1 is a schematic perspective view of a detachable computer in accordance with an embodiment of the present invention. FIG. 2 is a perspective view illustrating that a host is detached from an expansion base in FIG. 1. Please refer to FIGS. 1 and 2. The detachable computer 100 of the present embodiment is exemplified by a point of sales system; however, the use of the detachable computer 100 is not limited in the present invention. The detachable computer 100 includes a host 110, an expansion base 120, a first electrical connection portion 125, a second electrical connection portion 114, at least one first latch structure 130 and at least one second latch structure 140. The host 110 has a display surface 111 and a back surface 112 opposite to each other. The host 110 is, for example, a tablet computer, and the display surface 111 is, for example, a touch display surface. The first latch structure 130 is provided on the back surface 112. The expansion base 120 includes an engaging plate 121 for engaging with the host 110. The second latch structure 140 fits with the first latch structure 130 and is provided on an engaging surface 122 of the engaging plate 121 for engagement with the host 110. FIG. 2 is exemplified by two first latch structures 130 and two second latch structures 140; however, the total number of the first latch structures 130 and the second latch structures 140 is not limited in the present invention. In other embodiments, the total number of the first latch structures 130 and the second latch structures 140 may be one or more than two, respectively.

One of each of the pair of first latch structure 130 and second latch structure 140 includes a clamp portion, and another one of each of the pair of first latch structure 130 and second latch structure 140 includes a clip member. Taking FIG. 2 as an example, the first latch structure 130 includes a clip member 131 and the corresponding second latch structure 140 includes a clamp portion 141. The host 110 is engaged with the engaging plate 121 by latching the clip member 131 with the clamp portion 141. In another embodiment, the second latch structure includes, for example, the clip member, and the first latch structure includes, for example, the clamp portion.

Figures 3A, 3B:
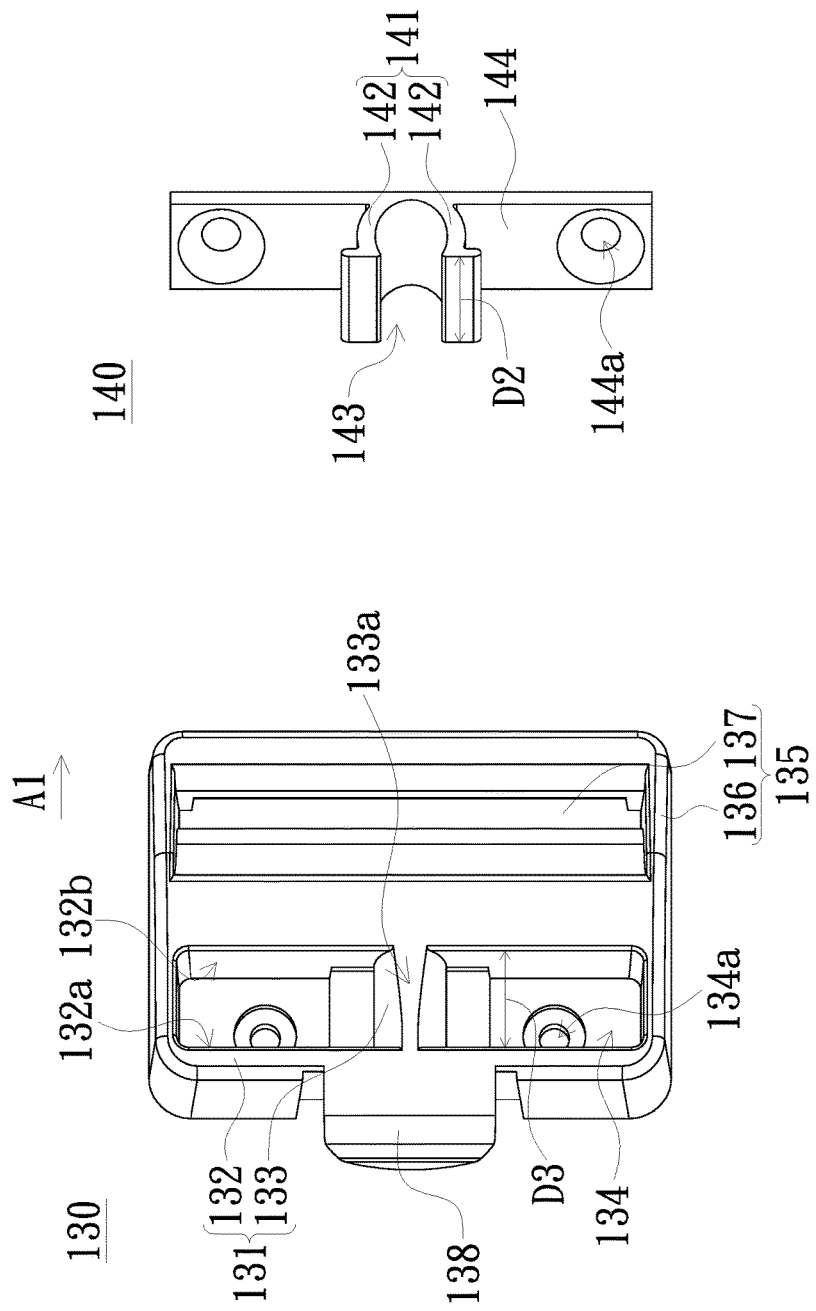
FIG. 3A is a schematic perspective view of the first latch structure in FIG. 2.
FIG. 3B is a schematic perspective view of the second latch structure in FIG. 2.
Figure 3C:
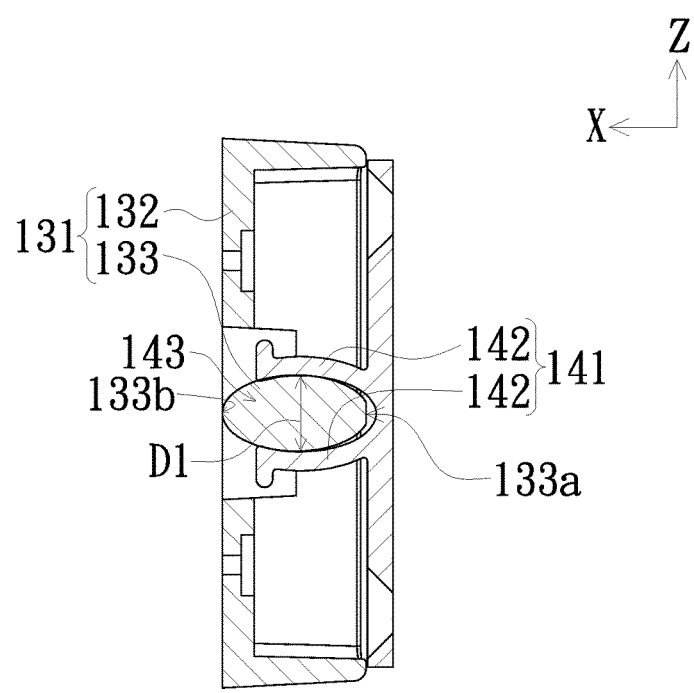
FIG. 3C is a cross-sectional view when the first latch structure and the second latch structure in FIG. 2 are engaged with each other.

FIG. 3A is a schematic perspective view of the first latch structure in FIG. 2. FIG. 3B is a schematic perspective view of the second latch structure in FIG. 2. FIG. 3C is a cross-sectional view when the first latch structure and the second latch structure in FIG. 2 are engaged with each other. Please refer to FIGS. 2 and 3A-3C. The clip member 131 includes a frame 132 and a clip column 133. The clip column 133 extends from a first sidewall 132a of the frame 132 in a predetermined direction A1 to a second sidewall 132b of the frame 132 opposite to the first sidewall 132a. The clip member 131 is latched into the clamp portion 141 through the clip column 133. The clamp portion 141 includes, for example, two opposite gripping arms 142. The two gripping arms 142 are resilient. An opening 143 is formed between the two gripping arms 142, and the clip column 133 can be inserted into between the two gripping arms 142 through the opening 143. Specifically, the clip column 133 has a front end 133a facing the clamp portion 141 and a rear end 133b opposite to the front end 133a. The thickness D1 of the clip column 133 is gradually thickened and then gradually thinned from the front end 133a to the rear end 133b. The two gripping arms 142 of the clamp portion 141 are formed in a C-shape corresponding to the shape of the clip column 133, so that the gripping arms 142 are gradually distracted when the front end 133a of the clip column 133 is inserted into the opening 143. Then, when the thickest part of the clip column 133 (e.g., the center between the front end 133a and the rear end 133b) passes through the opening 143, the two distracted gripping arms 142 are restored to their original positions. Thus, the clip column 133 is clamped by the two gripping arms 142. In addition, in one embodiment, the material of the clip member 131 is, for example, nylon, and the material of the clamp portion 141 is, for example, polyoxymethylene (POM); so that when the clip member 131 is engaged with the clamp portion 141, there would be no irritating sound. However, the material of the clip member 131 and the clamp portion 141 is not limited in the present invention.

In the present embodiment, the predetermined direction A1 is, for example, parallel to a bottom edge 123 of the engaging plate 121. The bottom edge 123 of the engaging plate 121 extends, for example, in the Y-axis direction, so that the clip column 133 and the clamp portion 141 cannot move relative to each other in the Z-axis direction and X-axis direction perpendicular to the Y-axis direction when the clamp portion 141 clamps the clip column 133. Further, the width D2 of the gripping arm 142 may be designed to be slightly smaller than the width D3 between the first sidewall 132a and the second sidewall 132b; so that when the clip column 133 is latched into the clamp portion 141, the clamp portion 141 can substantially abut against the first sidewall 132a and the second sidewall 132b by the two side edges of the respective gripping arms 142, and thereby limiting the distance between the clip column 133 and the clamp portion 141 moving relative to each other in the Y-axis direction. The aforementioned substantially abutting against" refers to making the distance of the relative movement smaller than a distance that would lead to a broken line when the first electrical connection portion 125 and the second electrical connection portion 114 are connected with each other and move in the Y-axis direction. Preferably, the clip column 133 and the clamp portion 141 are prevented from moving relative to each other in the Y-axis direction. Therefore, in the present embodiment, the host 110 and the expansion base 120 can be engaged firmly. Further, when it is desired to detach the host 110 from the expansion base 120, the host 110 can be pulled out of the expansion base 120 by simply grasping the host 110 and applying a force on the host 110 in the X-axis direction away from the engaging plate 121. Thus, the host 110 would be easy to detach from the expansion base 120.

A bottom portion 134 of the frame 132 is provided with, for example, two through holes 134a, through which a locking member (not shown) locks the first latch structure 130 to the back surface 112 of the host 110. In another embodiment, the first latch structure 130 may be integrally formed with the host 110. In addition, the second latch structure 140 includes, for example, a bottom plate 144, and the clamp portion 141 is formed on the bottom plate 144. The bottom plate 144 is provided with, for example, two through holes 144a, through which a locking member (not shown) locks the second latch structure 140 to the engaging surface 122 of the engaging plate 121. In another embodiment, the second latch structure 140 may be integrally formed with the engaging plate 121.

Please refer to FIG. 2. The engaging plate 121 of the present embodiment has, for example, a platform deck 124 extending from the bottom edge 123 of the engaging plate 121 in a direction away from the engaging surface 122. The platform deck 124 is provided with the first electrical connection portion 125. A bottom surface 113 of the host 110, which is located between the display surface 111 and the back surface 112, is provided with the second electrical connection portion 114. When the host 110 is engaged with the engaging plate 121, the bottom surface 113 of the host 110 is connected to the platform deck 124, and the first electrical connection portion 125 and the second electrical connection portion 114 are electrically connected to each other to transmit signals to each other. In the present embodiment, the first electrical connection portion 125 includes, for example, a plurality of pogo pins, and the second electrical connection portion 114 includes, for example, a plurality of metal pads corresponding to these pogo pins. Because the host 110 and the expansion base 120 of the present embodiment can be firmly engaged with each other, the host 110 and the expansion base 120 would not shake relative to each other when the user performs an operation on the host 110, and therefore a poor connection between the first electrical connection portion 125 and the second electrical connection portion 114 caused by the users using the host 110 for a long period of time is avoided.

The platform deck 124 may be further provided with at least one alignment bolt 126 (FIG. 2 is exemplified by two alignment bolts 126). The bottom surface 113 of the host 110 may be further provided with at least one alignment hole 115 (FIG. 2 is exemplified by two alignment holes 115) corresponding to the at least one alignment bolt 126. The alignment bolt 126 is inserted into the respective alignment hole 115 when the host 110 is engaged with the engaging plate 121. Further, the bottom surface 113 of the host 110 may have a concave portion 116, and the second electrical connection portion 114 is provided at the concave portion 116. The platform deck 124 may have a convex portion 127 corresponding to the concave portion 116, and the first electrical connection portion 125 is provided at the convex portion 127. The concave portion 116 and the convex portion 127 are engaged with each other when the host 110 is engaged with the engaging plate 121. When it is desired to engage the host 110 with the engaging plate 121, the concave portion 116 and the convex portion 127 are utilized to engage with each other in a positional alignment first so that the alignment bolt 126 can be easily inserted into the alignment hole 115, and then the host 110 is pressed in the X-axis direction toward the engaging plat 121, and thereby engaging the first latch structure 130 and the second latch structure 140 with each other. The design of the alignment bolt 126 and the respective alignment hole 115 and the design of the concave portion 116 and the respective convex portion 127 facilitate the engagement between the host 110 and the engaging plate 121 of the expansion base 120 in a positional alignment, and also make the host 110 and the expansion base 120 can be engaged with each other more firmly.

The engaging surface 122 of the engaging plate 121 of the present embodiment has, for example, a groove 128, and the second latch structure 140 is provided in the groove 128 without protruding out of the engaging surface 122. The first latch structure 130 is provided, for example, on the back surface 112 of the host 110 and protrudes out of the back surface 112 of the host 110. Thus, when the host 110 is engaged with the engaging plate 121, the first latch structure 130 can be accommodated in the groove 128 and engaged with the second latch structure 140, thereby allowing the host 110 to be smoothly engaged with the engaging plate 121. The present embodiment is exemplified by, for example, that one groove 128 accommodates two second latch structures 140. In another embodiment, the total number of grooves may be a plurality such that one groove accommodates one second latch structure 140.

Figure 4:
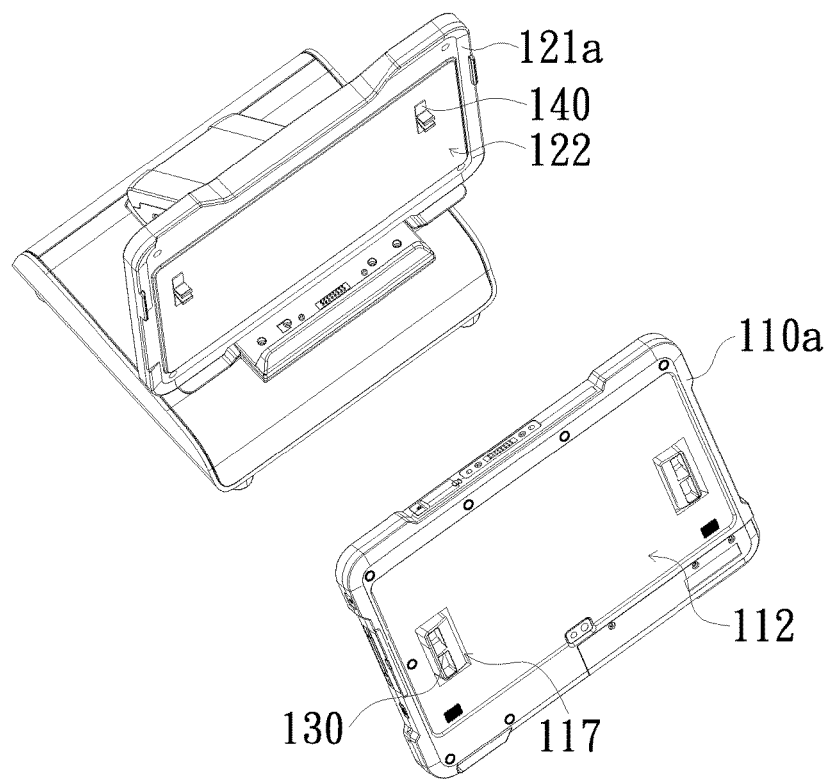
FIG. 4 is a perspective view of a detachable computer when its host is detached from its expansion base in accordance with another embodiment of the present invention.

In another embodiment shown in FIG. 4, the back surface 112 of a host 110a may be designed to have a groove 117 corresponding to the first latch structure 130. The first latch structure 130 is provided in the groove 117 without protruding out of the back surface 112. The engaging surface 122 of an engaging plate 121a does not have a groove for accommodating the second latch structure 140. The second latch structure 140 is provided on the engaging surface 122 of the engaging plate 121a and protrudes out of the engaging surface 122 of the engaging plate 121a. The total number of the grooves 117 corresponds to the total number of the first latch structures 130 so that each of the grooves can accommodate one first latch structure 130. In still another embodiment, one groove may accommodate a plurality of first latch structures 130.

Please refer to FIGS. 2 and 3A. Each of the first latch structures 130 may further include a handheld strap fixing portion 135 attached to the frame 132. The detachable computer 100 may further include, for example, a handheld strap 150 fixed between the two handheld strap fixing portions 135. The handheld strap fixing portion 135 includes, for example, another frame 136 connected to the frame 132 and a cross bar 137 provided in the frame 136. The frame 132 may be integrally formed with the frame 136. The handheld strap 150 can be wound around the cross bar 137 and fixed to the handheld strap fixing portion 135. The handheld strap 150 provided on the back surface 112 of the host 110 allows the user to hold the host 110 without easily dropping it. In another embodiment, the handheld strap fixing portion and the first latch structure may be provided on the back surface 112 of the host 110, respectively, as two separate members.

Figure 5:
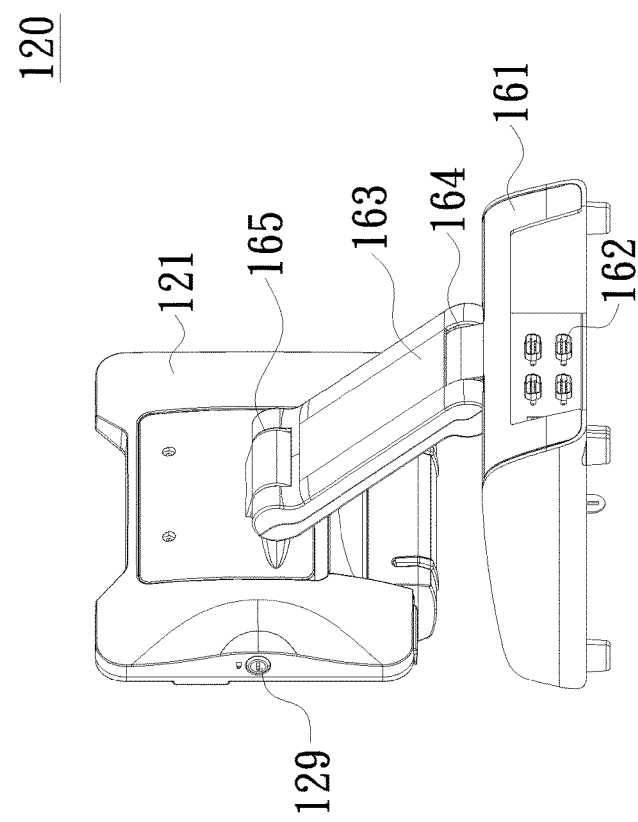
FIG. 5 is a perspective view of the expansion base in FIG. 1 from another viewing angle.

FIG. 5 is a perspective view of the expansion base in FIG. 1 from another viewing angle. Please refer to FIGS. 3A and 5. The first latch structure 130 may further include an extension block 138 attached to the frame 132, and the engaging plate 121 is further provided with a locking member 129 corresponding to the extension block 138. When the host 110 in FIG. 1 is engaged with the engaging plate 121 and the locking member 129 is switched to a locking state, the locking member 129 can block the extension block 138 from moving in a direction away from the engaging plate 121; thus, the host 110 in FIG. 1 is prevented from detaching from the engaging plate 121.

Further, the expansion base 120 of the present embodiment further includes, for example, a base 161 and a holder 163. The engaging plate 121 is fixed to the base 161 through the holder 163. The expansion base 120 has a plurality of slots 162 for connection to external devices. The holder 163 is pivotally connected to the base 161, for example, through a pivot 164 and is pivotally connected to the engaging plate 121 through a pivot 165. Thus, the holder 163 is rotatable relative to the base 161 within a predetermined angular range and the engaging plate 121 is rotatable relative to the holder 163 within another predetermined angular range.

Figure 6A:
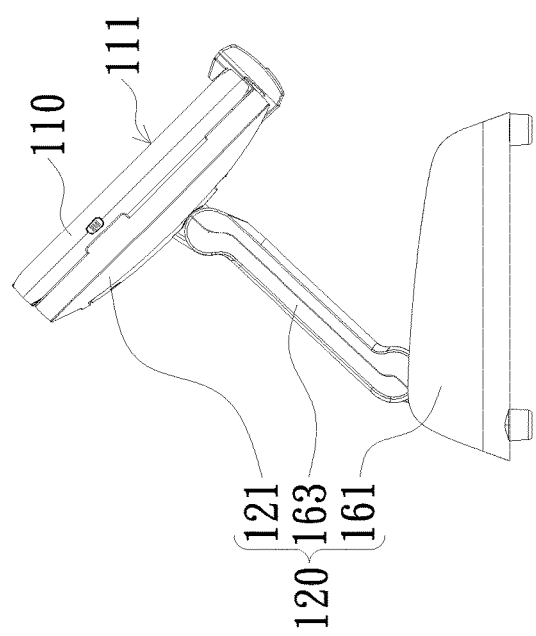
FIGS. 6A-6C are schematic views of the detachable computer of FIG. 1 in different states of use.
Figure 6B:
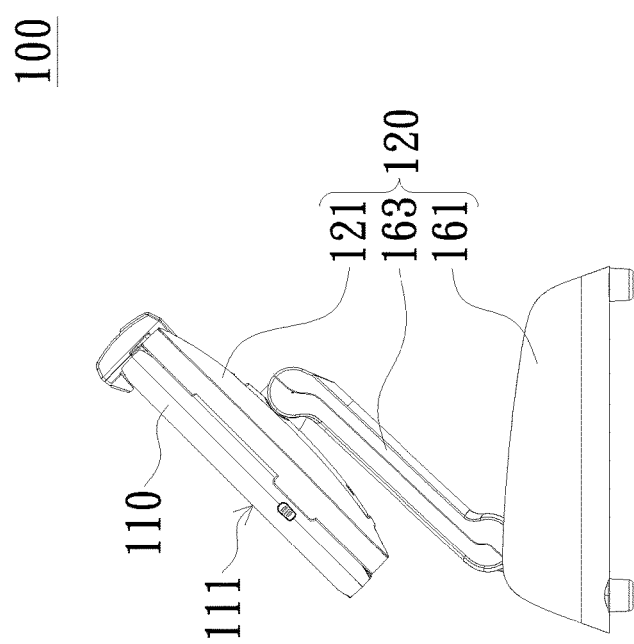
Figure 6C:
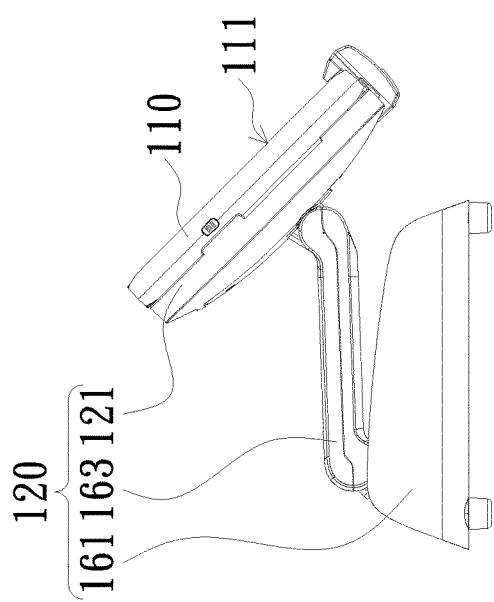

FIGS. 6A-6C are schematic views of the detachable computer of FIG. 1 in different states of use. Taking FIG. 6A as an example. The display surface 111 of the host 110 faces, for example, the teller end to facilitate the teller to operate the host 110. When it is desired to allow the customer to view the relevant information, the engaging plate 121 can be rotated relative to the holder 163 so that the display surface 111 can face the customer end (as shown in FIG. 6B). It is to be noted that because the host 110 and the engaging plate 121 of the expansion base 120 of the present embodiment can be engaged firmly, the host 110 would not fall from the engaging plate 121 even when the display surface 111 faces the customer end which may lead to the bottom surface 113 of the host 110 faces upwardly. Further, the holder 163 may be rotated relative to the base 161 to adjust the height of the host 110 relative to the base 161, thereby meeting different requirements of use. For example, when the position of the host 110 is too high for the user to view the display surface 111, the holder 163 can be rotated relative to the base 161 to allow the host 110 to drop from the position in FIG. 6A to the position in FIG. 6C.

In summary, in the detachable computer of the present invention, because the clip column is latched into the clamp portion and the two side edges of the clamp portion are substantially abutted against the first sidewall and the second sidewall of the frame of the clip member, the host and the expansion base can be firmly engaged with each other. Moreover, such engagement also facilitates detachment of the host and the expansion base. Further, in one embodiment, by providing the platform deck extending from engaging plate of the expansion base with the alignment bolt and providing the bottom surface of the host with the alignment hole, engagement of the host and the engaging plate in a positional alignment is facilitated and also the host and the expansion base are engaged with each other more firmly. In addition, in one embodiment, by a design of the bottom surface of the host and the platform deck being respectively provided with a concave portion and a convex portion matched to each other, engagement of the host and the engaging plate in a positional alignment is facilitated and also the host and the expansion base are engaged with each other more firmly.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A detachable computer, comprising: a host, having a display surface and a back surface opposite to the display surface; at least one first latch structure, disposed on the back surface; an expansion base, comprising an engaging plate for engaging with the host; and at least one second latch structure, fitting with the at least one first latch structure and disposed on an engaging surface of the engaging plate for engaging with the host, wherein one of each pair of the first latch structure and the second latch structure comprises a clamp portion, another one of each pair of the first latch structure and the second latch structure comprises a clip member, the host is engaged with the engaging plate by latching the clip member with the clamp portion, the clip member comprises a frame and a clip column, the clip column extends from a first sidewall of the frame in a predetermined direction to a second sidewall of the frame opposite to the first sidewall, the clip member is latched into the clamp portion through the clip column, and two sides of the clamp portion substantially abut against the first sidewall and the second sidewall when the clip column is latched into the clamp portion, wherein the engaging plate comprises a platform deck extending from a bottom edge of the engaging plate in a direction away from the engaging surface, the platform deck comprises a first electrical connection portion, a bottom surface of the host disposed between the display surface and the back surface comprises a second electrical connection portion, wherein when the host is engaged with the engaging plate, the bottom surface of the host is connected to the platform deck, and the first electrical connection portion and the second electrical connection portion are electrically connected to each other, and wherein the predetermined direction is parallel to the bottom edge of the engaging plate.

2. The detachable computer according to claim 1, wherein the clamp portion comprises two opposite gripping arms, and two side edges of the two gripping arms substantially abut against the first sidewall and the second sidewall when the clip column is latched into the clamp portion.

3. The detachable computer according to claim 1, wherein a total number of the at least one first latch structure and a total number of the at least one second latch structure are two respectively, each of the first latch structures comprises the clip member, each of the second latch structures comprises the clamp portion, each of the first latch structures further comprises a handheld strap fixing portion attached to the frame, and the detachable computer further comprises a handheld strap fixed between the handheld strap fixing portions.

4. The detachable computer according to claim 1, wherein each of the first latch structures comprises the clip member, each of the second latch structures comprises the clamp portion, each of the first latch structures further comprises an extension block connected to the frame, and the engaging plate further comprises a locking member corresponding to the extension block, wherein when the host is engaged with the engaging plate and the locking member is switched to a locking state, the locking member blocks the extension block from moving in a direction away from the engaging plate.

5. The detachable computer according to claim 1, wherein the platform deck further comprises at least one alignment bolt, the bottom surface of the host further comprises at least one alignment hole corresponding to the at least one alignment bolt, and the at least one alignment bolt is inserted into the respective alignment hole when the host is engaged with the engaging plate.

6. The detachable computer according to claim 1, wherein the bottom surface of the host has a concave portion, the second electrical connection portion is disposed at the concave portion, the platform deck has a convex portion matching to the concave portion, the first electrical connection portion is disposed at the convex portion, and the concave portion and the convex portion are engaged with each other when the host is engaged with the engaging plate.

7. The detachable computer according to claim 1, wherein the engaging surface of the engaging plate has a groove, the at least one second latch structure is disposed in the groove, and the at least one first latch structure protrudes out of the back surface of the host.

8. The detachable computer according to claim 1, wherein the back surface of the host has at least one groove corresponding to the at least one first latch structure, each of the first latch structures is disposed in the respective groove, and the at least one second latch structure protrudes out of the engaging surface of the engaging plate.

* * * * *